United States Patent [19]
Thatcher

[11] 3,876,957
[45] Apr. 8, 1975

[54] GAS-ION LASER WITH GAS PRESSURE MAINTENANCE MEANS

[75] Inventor: John B. Thatcher, Cupertino, Calif.

[73] Assignee: Holosonics, Inc., Richland, Wash.

[22] Filed: Oct. 15, 1973

[21] Appl. No.: 406,342

[52] U.S. Cl................. 331/94.5 T; 330/4.3; 55/16; 55/158; 315/110; 313/175; 313/180
[51] Int. Cl............................................... H01s 3/22
[58] Field of Search....... 331/94.5; 330/4.3; 55/158, 55/16; 313/174 T; 315/110

[56] References Cited
UNITED STATES PATENTS
3,566,304  2/1971  Neusel et al. .................... 331/94.5

FOREIGN PATENTS OR APPLICATIONS
148,153  12/1962  U.S.S.R. ............................ 313/180

OTHER PUBLICATIONS
Peters et al., J. Physics, Part B, Vol. 3, No. 9, Sept., 1970, pp. 719-721.

Primary Examiner—Robert J. Webster
Attorney, Agent, or Firm—Wells, St. John & Roberts

[57] ABSTRACT

A gas-ion laser is described including means to maintain the ionizable gas in the laser cavity at a rather constant pressure over an extended period of time to significantly increase the useful life of the gas-ion laser. The gas laser includes a gas makeup system having a high pressure source or storage container and a regulating valve. The valve has a permeable solid state orifice member through which the gas flows from the high pressure source to the laser cavity to replenish the gas in the laser cavity and maintain the gas pressure in the cavity rather constant. The permeable orifice member is selected from a solid state material having a permeability that is variable in relation to the magnitude of the energy applied to the orifice member. The gas-ion laser has a valve operating means such as a heater for varying the applied energy such as thermal energy to the member to regulate the gas flow. Additionally, the gas-ion laser has a valve control means that is responsive to the gas pressure in the laser cavity for controlling the valve control means to maintain the pressure at a desired level.

4 Claims, 6 Drawing Figures

GAS-ION LASER WITH GAS PRESSURE MAINTENANCE MEANS

BACKGROUND OF THE INVENTION

This invention relates to gas-ion lasers and more particularly to gas-ion lasers having facilities for adding makeup gas to the laser discharge cavity to extend the operating life of the laser.

To obtain optimum operating performance from a gas laser, it is necessary to maintain the pressure of the ionizable gas or the partial pressures of the ionizable gases within a limited narrow pressure passage. This is made difficult because the laser in effect "consumes" or "loses" gas during the laser operation causing gradual pressure decay. Some of the ionizable gas is adsorbed in the envelope walls of the laser envelope and gradually diffuses through the walls of the laser with a resultant loss of gas pressure within the laser cavity. Additionally, some gas is lost by being trapped by electrode sputtering. It is not unusual for a laser that has been filled to the optimum pressure to have a life as low as 100 hours because of the loss of gas from the laser cavity. As a result the laser light output is significantly decreased. After approximately 1,000 hours operation, the laser will cease to emit coherent light.

One of the basic problems inherent in the manufacture and operation of gas-ion lasers is the need to avoid contaminating the gas. To accomplish this, it is necessary to fully cleanse the interior of the laser envelope and to avoid any subsequent contamination entering the laser cavity. This is best accomplished by subjecting the laser envelope to baking temperatures in the neighborhood of 500°C. for a desirable duration such as two hours to remove the contaminates including gases that may be adsorbed by the envelope wall. The cavity is then backfilled with the desired laser gas and then sealed to provide a hermetically sealed enclosure.

In order to partially correct or partially compensate for the gas decay problem, laser manufacturers have in the past added bakeable reservoir cavities of rather large diameter to surface area ratios to increase the gas supply and decrease the rate of gas pressure decay within the active laser cavity.

Attempts have been made to provide makeup gas to the laser cavity through a valve system such as that illustrated in FIG. 1. However, one of the principal problems with the configuration illustrated in FIG. 1 is that the valve cannot be subjected to the decontaminating baking temperatures without destroying the valve. Additionally, the likelihood of leakage and contamination is inherent in such a system.

To overcome such limitations, other configurations such as that illustrated in FIG. 2 have been devised. In FIG. 2 enclosed pressurized ampuls of gas are included in a flexible hermetically sealed container so that when additional gas is needed, one of the ampuls can be broken and makeup gas transmitted into the laser cavity. Although such a system may be purged by subjecting the entire system to high temperatures to bake out the impurities, such a system does not significantly increase the life of the laser and such a system is not amenable to continuous automatic control and operation.

One of the principal objects of this invention is to provide a gas-ion laser that is capable of significantly increasing the life of the laser while maintaining a hermetically sealed system.

An additional object of this invention is to provide a gas-ion laser that is capable of maintaining the gas pressure in the laser cavity at rather constant value over a long period of time.

A further object of this invention is to provide a gas-ion laser capable of adding additional gas to the laser cavity as needed, in which the pressure maintenance system is capable of withstanding the baking temperatures necessary to decontaminate the cavity prior to adding the ionizable gas.

An additional object of this invention is to provide a vacuum valve between the high pressure reservoir and the active laser cavity in which the valve has no moving parts or seals.

A further objective of this invention is to provide a gas-ion laser that may readily adjust the amount of makeup gas supplied to the active cavity.

A still further object of this invention is to provide a gas-ion laser having a refilling or replenishment system that is automatically controlled to maintain the pressure within the laser cavity at a desired level.

These and other objects and advantages of this invention will become apparent upon reading the following detailed description of preferred and alternate embodiments.

A preferred and alternate embodiments of this invention have been chosen for purposes of illustration and description. Such embodiments are not intended to be exhaustive nor to limit the invention to the precise form disclosed. They are chosen and described in order to best explain the principles of the invention and their application in practical use to thereby enable others skilled in the art to best utilize the invention in various embodiments and modifications as are best adapted to the particular use contemplated. Materials other than those disclosed may also be used. As various changes may be made in form, construction and arrangement of components herein without departing from the spirit and scope of the invention and without sacrificing any of the advantages, it is to be understood that all matter herein is to be interpreted as illustrative and not limiting.

BRIEF DESCRIPTION OF THE DRAWINGS

A preferred and alternate embodiments of this invention are illustrated in the accompanying drawings, in which.

DETAILED DESCRIPTION OF A PREFERRED AND ALTERNATE EMBODIMENTS

Figure 1:
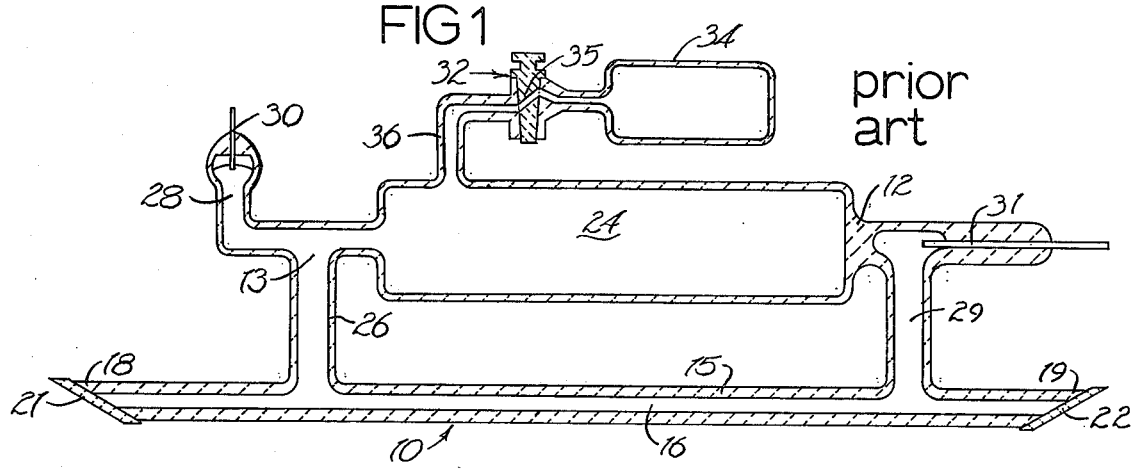
FIG. 1 is an illustrational cross-sectional view showing a prior art gas-ion laser system illustrating a makeup gas supply system having a mechanical valve.
Figure 2:
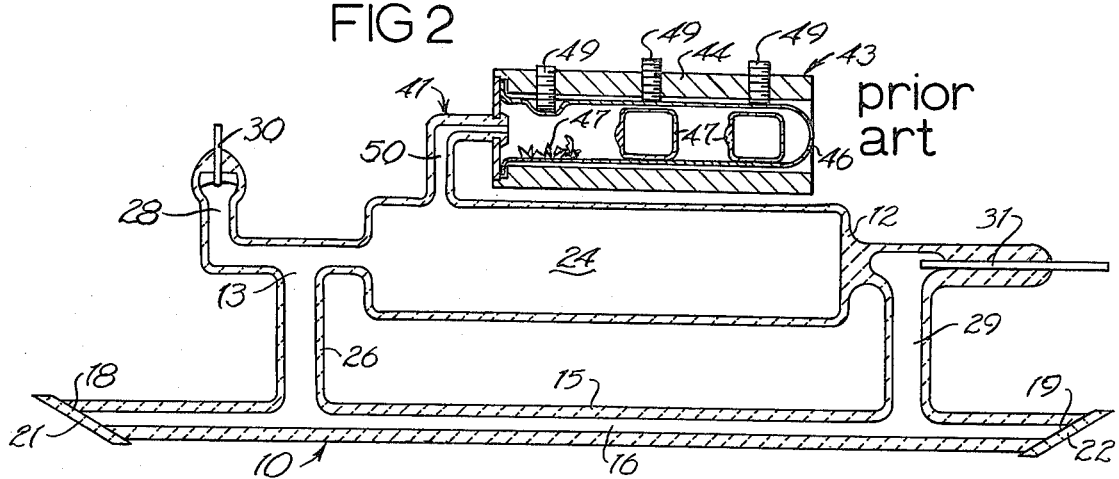
FIG. 2 is an illustrational cross-sectional view of a prior art gas-ion laser showing a gas supply system having breakable ampuls for supplying gas to the laser active cavity.

To fully appreciate the applicant's invention, it is desirable to review two prior art configurations that are illustrated in FIGS. 1 and 2.

FIG. 1 illustrates a prior art gas-ion laser 10 for producing a monochromatic coherent light beam. The general principles of the gas-ion laser are generally well known and shall not be dealt with any degree of detail. Generally the gas-ion laser includes an electrically insulative envelope or housing 12 made of glass, quartz or ceramic material. Samples of various type of envelope or housing materials are illustrated in U.S. Pat. Nos. 3,450,497; 3,555,451; 3,492,596; 3,699,470 and 3,721,716. The envelope or housing 12 encloses a gas-filled cavity 13. The cavity is filled with an ionizable gas. Most lasers include a noble gas or mixture thereof such as argon, helium, neon, xenon, krypton. Additionally, other types of ionizable gases may be utilized such as nitrogen, oxygen, sulfur hexafluoride, carbon monoxide and carbon dioxide. However, it should be noted that this invention is not limited to any particular gas or group of ionizable gases. One of the major components of the laser is a laser tube section 15 that includes an active discharge cavity 16. The laser tube 15 terminates in ends 18 and 19 having planar windows 21 and 22 respectively that are positioned at an angle with respect to the axis of the laser tube 15 known as the Brewster angle. Interconnected to the laser tube 15 is a reservoir cavity 24 having a rather large diameter in comparison to the laser tube to equalize the pressure of the gas in the laser and to supply additional gas to the laser and prolong the life of the laser operation. Generally, the reservoir 24 has an increased volume to surface ratio to minimize or reduce the amount of pressure loss due to diffusion of a gas through the envelope.

An interconnecting tube 26 extends from the reservoir cavity 24 to the laser tube 15 to enable gas to pass freely from the reservoir cavity 24 to the laser tube 15. The envelope further includes spaced electrode cavity recesses 28 and 29 that are recessed from the laser tube 15 for receiving respective electrodes 30 and 31. During the operation of the laser electrical energy is applied between the electrodes 30, 31 to cause ionization of the gas in the laser tube and an ion discharge therebetween. The laser may be operated continuously or in a pulse mode.

As previously mentioned, an inherent problem with gas-ion lasers is the inability to maintain the pressure relatively constant for a long period of time because of diffusion of the gas through the insulative envelope and because of loss of gas by adsorption of gas into the envelope material. Additionally, gas is lost because of the action of electrodes sputtering material onto the surface of the envelope trapping some of the gas.

The principal problem with which this invention deals is to provide a system for increasing the life of the gas-ion laser by providing makeup gas to the laser to maintain the pressure in the laser above a desired level for efficient operation. The two lasers, illustrated in FIGS. 1 and 2 attempt to solve the problem, but have serious limitations. In FIG. 1, the gas-ion laser 10 includes a gas makeup supply system generally designated with the numerals 32. The system 32 includes a high pressure source or container 34 that is incorporated as a part of the envelope 12. A connecting tube 36 extends from the source 34 to the reservoir cavity 24. A mechanical valve 35 is positioned between the high pressure source 34 and the reservoir cavity 24 for regulating the supply of makeup gas from the high pressure source to the cavity. The valve 35 illustrated in FIG. 1 is a stopcock valve that is rotated to permit the flow of gas from the high pressure source 34 to the reservoir cavity 24. One of the principal problems with this device is that the valve 35 cannot be subjected to the baking temperatures necessary to decontaminate the envelope and remove all gases that may be adsorbed in the envelope before the envelope is backfilled with the ionizable gas. If the makeup supply system 32 illustrated in FIG. 1 is subjected to the baking temperatures of approximately 500° C., the valve will freeze and become inoperative.

To overcome this problem, a second type of prior art gas-ion laser 10 which is illustrated in FIG. 2 has been devised. The laser 10 illustrated in FIG. 2 is very similar to the one illustrated in FIG. 1 except for a different type of makeup supply system 41. The supply system 41 includes a high pressure source 43 that includes a cylindrical tube 44 that partially encloses a flexible metal enclosure 46. The enclosure 46 is hermetically sealed to a connecting tube 50 that supplies gas from one or more breakable ampuls 47 contained within the flexible enclosure 46. Threaded elements 49 are mounted in the tube 44 for depressing the metal enclosure 46 to break one of the ampuls to cause the gas in the high pressure ampuls 47 to flow into the reservoir cavity 24. FIG. 2 illustrates one of the ampuls 47 being broken.

System 41 may be subjected to the bakeable temperatures without becoming inoperative. However, the life of the laser is limited to the number of ampuls contained in the enclosure 46 and is further quite ineffective of maintaining a desired or constant pressure level.

The gas-ion laser of this invention includes a much improved gas makeup supply or replenishment system having a valve containing a variable solid state orifice member. The orifice member comprises a solid state diffusion membrane, plate, barrier or wall through which the gas flows from the high pressure source into the reservoir cavity 24. The rate of diffusion of gas through the solid state orifice member is generally a function of the gas pressure difference across the orifice member, the thickness of the orifice member and the exposed area of the orifice member. For any particular application each of these functions may be fixed. The solid state orifice member is constructed of a material in which the permeability of the material or the rate of diffusion through the material varies in relation to the amount of energy applied to the orifice member. Many different species of solid state material having a variable permeability may be utilized depending upon the particular application and the particular ionizable gas that is utilized in the laser. The orifice member selection must be matched with the particular gas utilized and the laser application. The wall material may be selected from glass, quartz, ceramics or metal.

Diffusion of gases through glass, quartz, ceramics, metals and other solid state materials has been the subject of much study. One summary of the accomplishments on this subject is included in the book "Scientific Foundations of Vacuum Techniques" by the Saul Dushman published by John Wiley and Sons, Inc., New York 2nd Ed. 1949.

Specific embodiments or examples of the application of this invention are illustrated in FIGS. 3–6.

Figure 3:
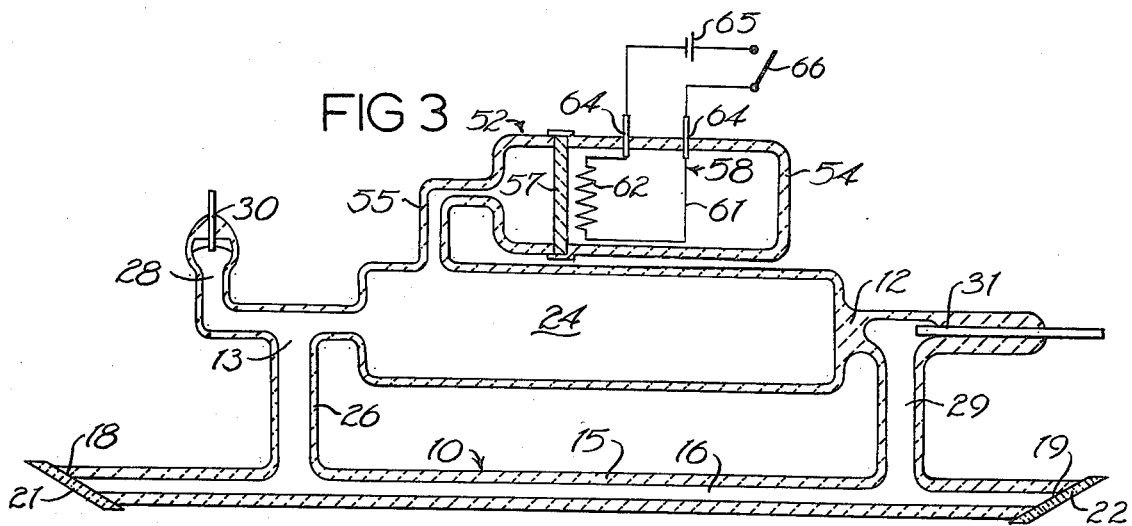
FIG. 3 is an illustrational cross-sectional view of a gas ion laser incorporating the principles of this invention illustrating a gas supply system having a unique valve.

Now turning to the specific embodiment illustrated in FIG. 3, the gas-ion laser is comprised of common elements having the same number as those illustrated in FIGS. 1 and 2 in addition to an improved makeup supply system 52. The system 52 includes a high pressure source or container 54 which may be an integral part of the electrically insulative envelope 12 or it may be attached. From the source or container 54, a connecting tube 55 extends to the reservoir cavity 24 for supplying high pressure gas to the cavity 13. The connecting tube 55 may also be an integral part of the laser envelope 12. The essential part of this invention is the valve 56 having a permeable solid state gas diffusion orifice member or wall 57. The wall 57 is constructed of material in which the rate of gas diffusion of the laser gas through the wall 57 varies in relation to the thermal energy applied to the wall. For lasers utilizing noble gas, a wall constructed of quartz or fused glass is preferred because of the inter-relationship between temperature and diffusion rate. The gas-ion laser includes a valve operating means 58 for applying thermal energy to the wall to vary the temperature of the wall and the rate of gas diffusion through the wall as desired. In this specific embodiment, an electrical heater 61 having a heating element 62 is positioned adjacent the wall for heating the wall 57 to a desired temperature, to regulate the desired rate of diffusion of the high pressure gas through the wall to the cavity 13. The heating element 62 includes wires that extend through a metal to glass seals 64 in the container 54. The heating element 62 is connected to an electrical circuit having electrical source 65 and a switch 66 for operating the heating element. In this embodiment the heating element may be operated continuously or it may be operated periodically depending upon the particular design and application.

Figure 4:
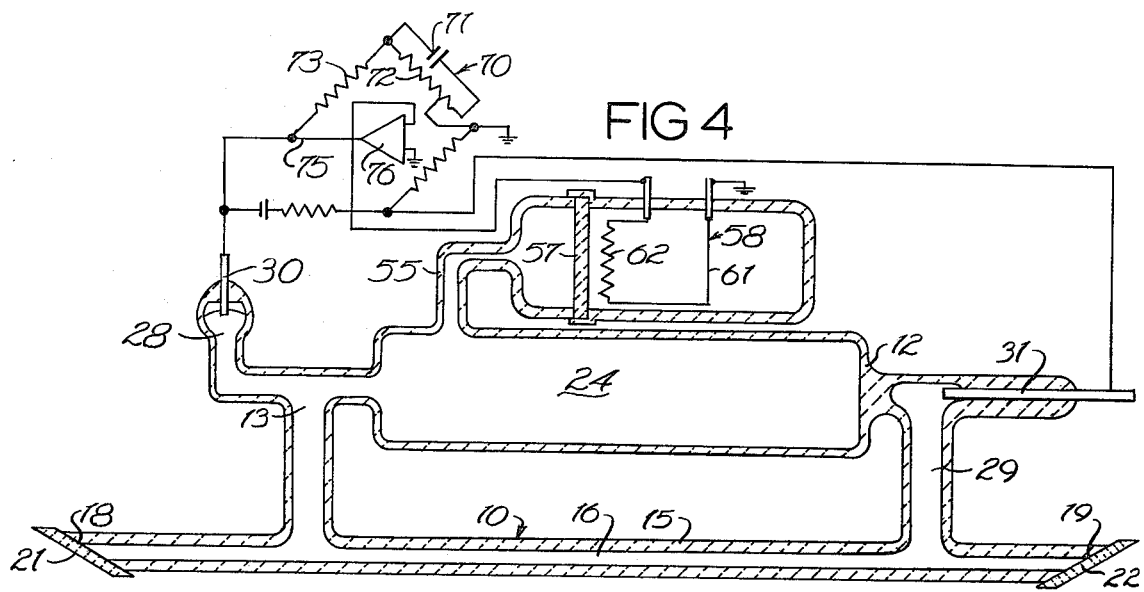
FIG. 4 is an illustrational cross-sectional view showing an alternate embodiment of the gas-ion laser.

The embodiment illustrated in FIG. 4 is quite similar to the one illustrated in FIG. 3 except it includes an additional feature of an automatic pressure control means 70 that is responsive to the actual pressure in the cavity 13 for controlling the valve operating means 58 to maintain the pressure within the cavity above a desired value or within a desired range. The embodiment illustrated in FIG. 4 would be considered as a preferred embodiment.

It has been found that the voltage across the electrodes 30 and 31 increases as the gas pressure drops in the cavity 13. Consequently, in the embodiment illustrated in FIG. 4, the voltage across the electrodes 30 and 31 is applied to one side of a bridge network to compare against a standard voltage source 71 which is adjusted by a rheostat 72 and by the choice of resistors 73 and 74 so that any deviation from a desired voltage produces an error signal which after amplification by electronic system 75 and particularly amplifier 76, is applied to the heater 61 to regulate and monitor the amount of thermal energy applied to the diffusion wall to vary the rate of gas diffusion from the high pressure source into the cavity 13 to maintain the pressure within the cavity 13 within a desired range or above a desired level.

Although there are various types of materials that may be utilized for the wall 57, a preferred material for thermal energy application is quartz. The rate of diffusion through quartz is known to be proportional to the temperature.

Figure 5:
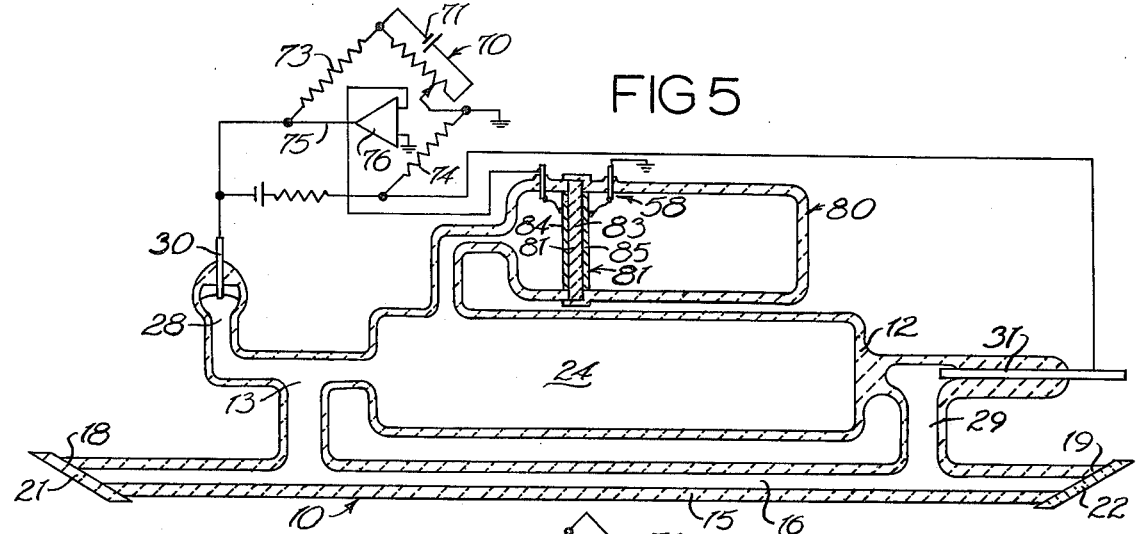
FIG. 5 is an illustrational cross-sectional view showing an alternate embodiment of this invention.

An alternate embodiment is illustrated in FIG. 5 having a gas makeup supply system 80 which includes a valve 81 containing a solid state orifice member 82. The member 82 includes a dielectric center 83 with thin electrode layers 84 and 85 on opposite sides of the center portion 83. Preferably, the electrode layers 84 and 85 (preferably silver) are vacuum deposited onto the center portion 83. The material 83 is chosen from those dielectric materials in which the rate of diffusion varies in relation to the magnitude of electrical field applied through the material. In this embodiment, the valve operating means 58 includes the means for applying a voltage potential between the electrodes 84 and 85. The pressure control system 70 includes means for varying the voltage potential across the layers 84 and 85 to vary the electrical field to in turn vary the rate of gas diffusion through the member 82. A preferred wall material 83 is selected from glass, quartz or ceramic.

Figure 6:
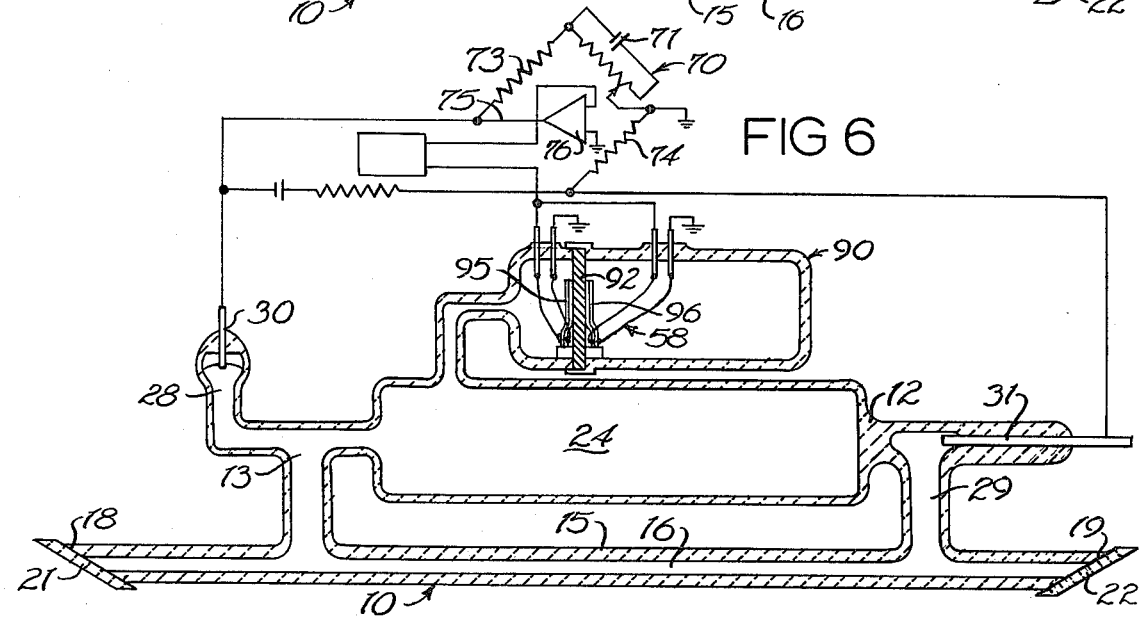
FIG. 6 is a schematic cross-sectional view showing an alternate embodiment of this invention.

An alternate embodiment is illustrated in FIG. 6 and includes a gas makeup supply system 90 having a solid state orifice member 92 in which the material is selected from those materials in which the rate of diffusion through the member varies in relation to the alternating mechanical force applied to the wall. In this embodiment, the valve operating means 58 includes a transducer operatively connected to the member 92 to apply mechanical vibration force to the wall in which the rate of diffusion through the member 92 varies with the amount of force applied. The transducer includes two bender units 95 and 96, such as flexing-type piezoelectric elements (Bimorphs) that are operatively connected to member 92. Preferably, member 92 is constructed of electrolytic copper. The pressure control system 70 further includes an oscillator unit 100 for causing the bender units 95 and 96 to vibrate the member 92 in which the amplitude of the vibration is controlled by the output of the amplifier 76.

Again it is repeated that various types of gas permeable solid state materials may be utilized for the variable orifice member depending upon the desired application and gas properties. The important aspects of the orifice member material and valve construction is that it must stand up when subjected to the baking process necessary to cleanse the envelope before the ionizable gas is backfilled into the cavity and that the orifice member must have a variable permeability related to the magnitude of energy such as thermal, electrical, or mechanical supplied to the member. Additionally, the invention includes a pressure control means for controlling the amount of energy applied to the orifice member to control the rate of diffusion and maintain a desired pressure within the laser cavity. In FIGS. 4–6, the voltage across the laser electrodes 30 and 31 is monitored by the automatic pressure control means 70. An alternate method would be to provide two other electrodes, separate from the laser electrodes, for this purpose.

It should be further understood that many other embodiments may be readily devised by those skilled in the gas laser art without deviating from the principles of this invention. Therefore, only the following claims are intended to define this invention and limit its scope.

What is claimed is:

1. In a gas-ion laser,
    an envelope having a laser cavity for receiving an ionizable gas;
    a source of pressurized ionizable gas interconnected to the envelope to supply the gas to the laser cavity;
    a valve between the source and the cavity to regulate the flow of gas from the source to the cavity;

said valve having a solid state orifice member that is permeable to the ionizable gas in which the rate of diffusion of the ionizable gas through the orifice member varies in relation to the amount of electrical energy applied through the orifice member; said solid state orifice member being constructed of a dielectric material having thin electrode layers on opposite sides thereof; and voltage means for varying an electrical energy field through the orifice member to vary the flow of gas from the source to the cavity.

2. In the laser defined in claim 1 wherein the valve is capable of being subjected to laser envelope baking temperatures of approximately 500° C. without injurious effects.

3. In a gas-ion laser, an envelope having a laser cavity for receiving an ionizable gas;

a source of pressurized ionizable gas interconnected to the envelope to supply the gas to the laser cavity;

a valve between the source and the cavity to regulate the flow of gas from the source to the cavity;

said valve having a solid state orifice member that is permeable to the ionizable gas in which the rate of diffusion of the ionizable gas through the orifice member varies in relation to the amount of mechanical energy applied to the orifice member tending to bend the orifice member; and bending force means for varying the amount of mechanical bending energy applied to the orifice member to very the flow of gas from the source to the cavity.

4. In the laser defined in claim 3 wherein the bending force means includes a transducer operatively connected to the member for applying a mechanical bending force to the member in response to the application of a voltage to the transducer.

* * * * *